United States Patent [19]
He

[11] Patent Number: 5,943,200
[45] Date of Patent: Aug. 24, 1999

[54] PEAK VOLTAGE CLAMPING CIRCUIT FOR HIGH FREQUENCY BOOST CONVERTER AND METHOD OF OPERATION THEREOF

[75] Inventor: Jin He, Plano, Tex.

[73] Assignee: Lucent Technologies Inc., Murray Hill, N.J.

[21] Appl. No.: 09/003,527

[22] Filed: Jan. 6, 1998

[51] Int. Cl.[6] .................................................... H02H 9/00
[52] U.S. Cl. ............................... 361/56; 361/58; 361/113; 361/115
[58] Field of Search ................................. 361/42, 56, 91, 361/100, 115, 58, 113

[56] References Cited

U.S. PATENT DOCUMENTS

| | | | |
|---|---|---|---|
| 5,550,458 | 8/1996 | Farrington et al. | 323/222 |
| 5,633,579 | 5/1997 | Kim | 323/222 |

OTHER PUBLICATIONS

"Soft Transitions Power Factor Correction Circuit" by Ionel Dan Jitaru; May 1993; pp. 202–208.
"Design Considerations for Power Converters Supplying the SAE J–1773 Electric Vehicle Inductive Coupler" by Nasser H. Kutkut and Keith W. Klontz; 1997 IEEE; pp. 841–847.
"A New Boost Converter Using a Non–Dissipative Snubber" by Joao Antonio Correa Pinto, Adriano Alves Pereira, Valdeir Jose Farias, Luiz Carlos de Freitas and Joao Batista Vieira Junior; 1996 IEEE; pp. 397–401.
"Analysis and Optimization of a Nondissipative LC Turn-Off Snubber" by Tamotsu Ninomiya, Tetsuro Tanaka and Koosuke Harada 1988 IEEE; pp. 147–156.
"Nondissipative Turn–Off Snubber in a Forward Converter: Analysis, Design Procedure and Experimental Verification" by Moshe Domb, and Richard Redl; Oct. 1985; pp. 54–68.
"Optimal Design for Natural Convection–Cooled Rectifiers" by Richard Garcia, Rui Liu and Victor Lee; 1996 IEEE pp. 813–822.
"Very High Efficiency Techniques and Their Selective Application to the Design of a 70A Rectifier" by Nigel Machin and Tino Vescovi 1993; pp. 126–133.
"A Snubber Configuration for Both Power Transistors and GTO PWM Inverters" by Tore Undeland, Frode Jenset, Arne Steinbakk, Terje Rogne and Magnar Hernes; 1984 IEEE; pp. 42–53.

*Primary Examiner*—Jeffrey Gaffin
*Assistant Examiner*—Stephen Jackson

[57] ABSTRACT

For use in a boost converter having a main boost switch, a boost inductor, a boost diode coupled to the boost inductor and the main boost switch and a resonant, passive snubber coupled to the boost inductor and the main boost switch that limits reverse recovery currents in the boost diode during a turn-on of the main boost switch, a peak voltage clamping circuit for, and method of, reducing voltage stress on the main boost switch caused by operation of the snubber. In one embodiment, the circuit includes a blocking switch and a zener diode, coupled in series between the main boost switch and the boost diode, that cooperate to provide a conductive path from the main boost switch to an output of the boost converter for electrical currents that exceed a predetermined peak voltage value thereby to reduce the voltage stress on the main boost switch.

20 Claims, 5 Drawing Sheets

PEAK VOLTAGE CLAMPING CIRCUIT FOR HIGH FREQUENCY BOOST CONVERTER AND METHOD OF OPERATION THEREOF

TECHNICAL FIELD OF THE INVENTION

The present invention is directed, in general, to power conversion and, more specifically, to a peak voltage clamping circuit for a high frequency boost converter that cooperates with a resonant, low-dissipation, passive snubber circuit to reduce boost diode reverse recovery currents, reduce boost main switch turn-off losses, and a method of operating such peak voltage clamping circuit to improve efficiency and reduce voltage and current stresses within the boost converter.

BACKGROUND OF THE INVENTION

High frequency boost converters have been widely used in various power conversion applications such as single phase and three phase power factor corrected AC/DC switch-mode rectifiers. The boost stage processes the AC input and develops a DC voltage that is typically between 400 volts and 800 volts depending on the input voltage level. Boost converters are usually the topology of choice for providing a high output voltage from substantially lower DC voltages. In applications with universal AC input voltages (e.g., 85 to 264 VAC) where an intermediate DC bus voltage of 400 volts is necessary, a soft-switched boost is often used to obtain a boost converter efficiency of 96% or better.

Major problem areas with high frequency, high power boost converters revolve around a reverse recovery current condition associated with the boost diode(s) during a turn-on transition of a main boost switch, and switching losses associated with the main boost switch of the converter. The switching devices of the boost converter are generally operated at very high frequencies thereby allowing the use of small energy storage elements and filtering components (such as inductors and capacitors) in the converter. As the switching frequency of the switching devices is pushed even higher to increase the converter power density, the reverse recovery condition associated with the boost diode(s) and the turn-on and turn-off losses associated with the main boost switch become more severe. A significant reverse recovery current may at worst damage or destroy both the boost diode(s) and the main boost switch and at best contribute to poor power conversion efficiency.

Other problems arise when high blocking voltage rated switching devices are required. The cost of the high blocking voltage rated switching devices is much higher than the lower voltage rated switching devices. Additionally, the higher voltage rated devices exhibit higher forward conduction voltage drops than the lower voltage rated devices which makes them more lossy and therefore less efficient.

To deal with these problems, various passive and active snubber circuits have been developed to address and compensate for these undesirable qualities. Some of these snubber circuits are very complicated and difficult to implement. Many have high losses and therefore contribute to lower converter efficiency which, while offering protection to the boost diodes and switches, just transfers the overall power loss to the snubber circuit.

Among the snubber circuits developed, the energy recovery snubber circuit with reduced turn-off loss is one of the more attractive operationally. The energy recovery snubber circuit, however, requires six to eight additional circuit components which often makes the circuit layout challenging in terms of minimizing stray inductance. Stray inductance causes spurious "ringing" at switching transition times which often significantly increases the voltage stresses on boost devices if left uncompensated. Furthermore, limiting the diode reverse recovery current too severely will not allow the circuit to function properly.

Another snubber circuit design is the simple resonant, nondissipative turn-off snubber circuit. This snubber circuit was developed for transformer isolated flyback and forward converters to protect the main switch from excessive voltage stress produced from the energy stored in the leakage inductance of a power transformer during the turn-off transition of the main switch. However, the resonant snubber itself may still produce larger than desired voltage stresses across the switch(es) and diode(s) when used for the boost converter.

Accordingly, what is needed in the art is a circuit that limits the voltage stresses on the critical devices of a boost converter and overcomes the deficiencies in the prior art.

SUMMARY OF THE INVENTION

To address the above-discussed deficiencies of the prior art, the present invention provides, for use in a boost converter having a main boost switch, a boost inductor, a boost diode coupled to the boost inductor and the main boost switch and a resonant, passive snubber coupled to the boost inductor and the main boost switch that limits reverse recovery currents in the boost diode during a turn-on of the main boost switch, a peak voltage clamping circuit for, and method of, reducing a voltage stress on the main boost switch caused by operation of the snubber. In one embodiment, the circuit includes a blocking switch and a zener diode, coupled in series between the main boost switch and the boost diode, that cooperate to provide a conductive path from the main boost switch to an output of the boost converter for electrical currents that exceed a predetermined peak voltage value thereby to reduce the voltage stress on the main boost switch. In one embodiment of the present invention, the blocking switch and the zener diode further cooperate to limit a voltage stress on the boost diode by providing a freewheeling current path for the snubber inductor.

The present invention therefore introduces the broad concept of providing a conductive path in a boost converter to deflect excessive currents caused by a resonant, passive snubber from the main boost switch in the converter. Deflection (or freewheeling) of the currents limits the peak voltage stresses that both the main boost switch and boost diode experience, allowing use of both the resonant, passive snubber, boost diode and a main boost switch having a lower voltage rating. The peak voltage clamping circuit also allows the use of nondissipative snubbers for a boost converter to further reduce the current and voltage stresses on the switching devices while further improving boost converter efficiency.

In one embodiment of the present invention, the predetermined peak voltage substantially equals an output voltage of the boost converter plus a reverse bias voltage of the zener diode. This is in stark contrast to the prior art, in which both the main boost switch and the boost diode routinely experienced peak voltages double the converter's output voltage.

In one embodiment of the present invention, the circuit further includes a snubber inductor, coupled in parallel with the series-coupled blocking and zener diodes, that limits a reverse recovery current through the boost diode. The snubber inductor, while not necessary to the present invention, nonetheless provides further protection to the converter's boost diode and also limits a turn-on peak current through the main boost switch.

In one embodiment of the present invention, the boost converter further comprises an output capacitor, coupled to the boost diode, that smooths an output voltage of the boost converter. The boost converter's output is therefore preferably high-quality DC power.

In one embodiment of the present invention, the blocking switch is a diode biased to conduct the electrical currents from the main boost switch to the boost diode. Of course, a controllable switch (such as a field effect transistor, or FET) and a corresponding controller may be employed to ensure that substantial electrical currents are not allowed to flow from the boost diode to the main boost switch.

In one embodiment of the present invention, the main boost switch is selected from the group consisting of: (1) an insulated gate bipolar transistor (IGBT), (2) a metal oxide semiconductor (MOS)-controlled thyristor (MCT) and (3) a MOSFET. Those skilled in the art will recognize, however, that the present invention is not limited to a particular type of main boost switch and therefore may be employed with any conventional or later-discovered switch.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
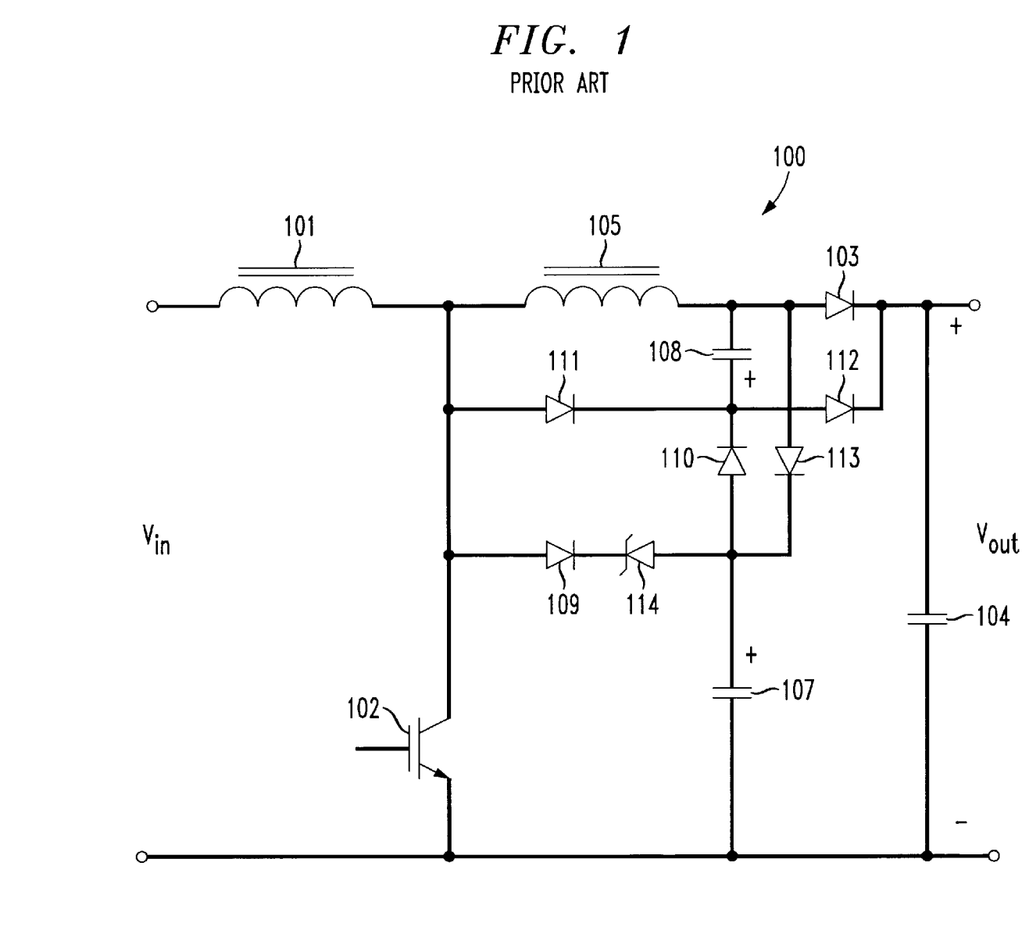
FIG. 1 illustrates a schematic diagram of a boost converter employing a prior art energy recovery snubber circuit.

Referring initially to FIG. 1, illustrated is a schematic diagram showing a boost converter 100 employing a prior art energy recovery snubber circuit. The boost converter 100 includes a boost inductor 101, a main boost switch 102, a boost diode 103 and an output capacitor 104. The snubber circuit includes an inductor 105, a first and second capacitor 107, 108, a plurality of diodes 109, 110, 111, 112, 113, and a zener diode 114. As stated earlier, this snubber design employs many components (nine in this case) which, at best, makes circuit layout challenging to minimize stray inductance. Additionally, other circuit design and operational constraints and trade offs must be met to assure that the boost converter 100 performs satisfactorily.

For example, during the turn-on transition of the main boost switch 102, the sum of the peak reverse recovery current of the boost diode 103 and the discharge current of the first snubber capacitor 107 must always be equal to or greater than the peak turn-off current of the boost inductor 101. Otherwise, the reverse recovery current will flow through diodes 111, 112 and the main boost switch 102 with nothing to limit its peak value which may cause circuit damage. If the size of the snubber inductor 105 is chosen to be small enough to allow sufficient reverse recovery current to be transferred to the second snubber capacitor 108, the condition stated above may be realized. This limitation on the size of snubber inductor 105 limits its overall effectiveness.

During the turn-on transition of the main boost switch 102, the first snubber capacitor 107 must be chosen large enough to transfer sufficient energy to the second snubber capacitor 108. To reduce the voltage stress on the boost diode 103, however, the voltage across second snubber capacitor 108 cannot be too high. This dictates that the second snubber capacitor 108 be very large with respect to the first snubber capacitor 107, normally fifteen to twenty times larger. Consequently, the second snubber capacitor 108 exhibits both a high capacitance value and a high ripple current and tends to be both bulky and expensive.

For a better understanding of the aforementioned snubber circuit see Lui, et al., Optimal Design for Natural Convection-Cooled Rectifiers, 1996 Intelec Proceedings, pp. 813–822, which is incorporated herein by reference.

Figure 2:
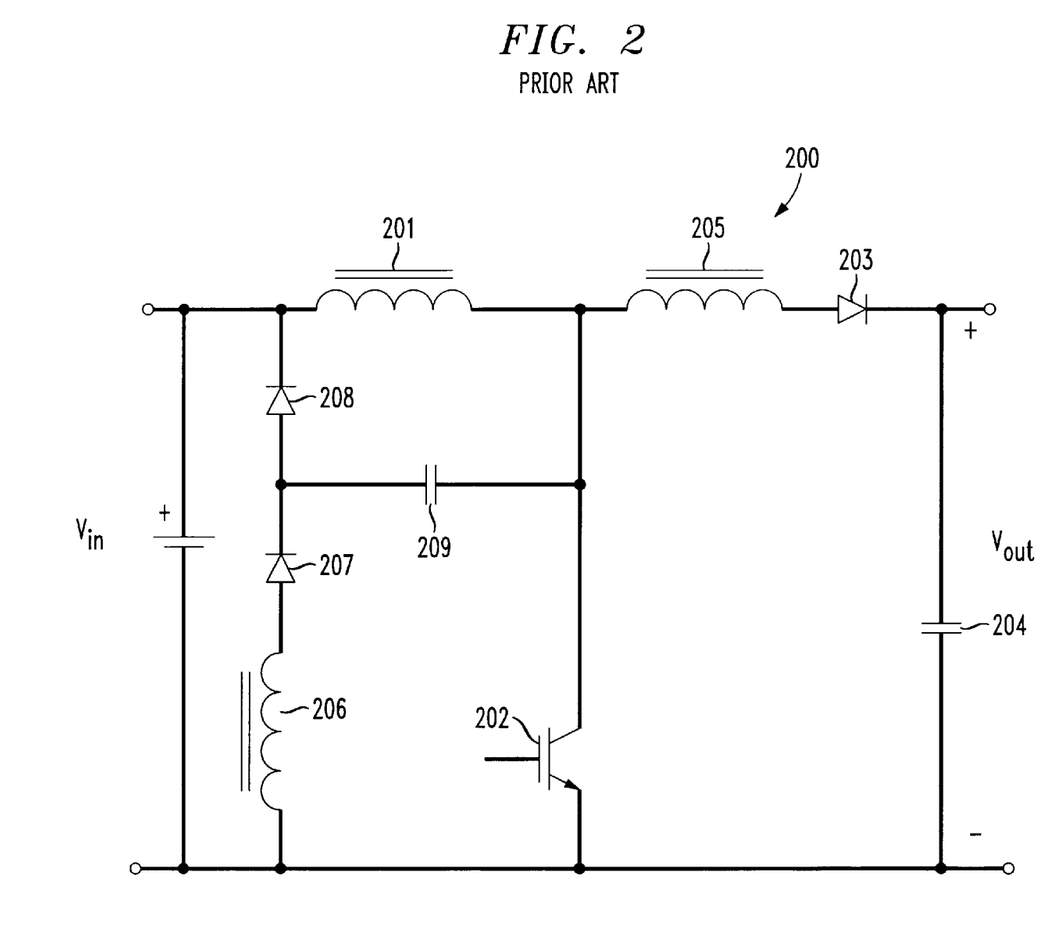
FIG. 2 illustrates a schematic diagram of a boost converter employing a prior art resonant nondissipative turn-off snubber circuit.

Turning now to FIG. 2, illustrated is a schematic diagram of a boost converter 200 employing a prior art resonant nondissipative turn-off snubber circuit. The boost converter 200 includes a boost inductor 201, a main boost switch 202, a boost diode 203 and an output capacitor 204. The snubber circuit includes first and second snubber inductors 205, 206, first and second snubber diodes 207, 208, and a snubber capacitor 209. For this boost converter 200, the snubber strategy is to treat the unwanted leakage inductance as a desired element by adding the first inductor 205 to the circuit. This snubber circuit limits the boost diode 203 reverse recovery current and reduces the main boost switch turn-off loss under certain operating ranges. The main boost switch 202, however, still experiences a peak voltage stress of at least twice the output voltage Vout during switching transients.

Another major drawback of this snubber circuit is that there is no current path for the reverse recovery current through the first snubber inductor 205 once the boost diode 203 stops reverse conducting. Consequently, a large voltage transient or "spike" generated across the first snubber inductor 205 is applied to the boost diode 203 along with the output voltage Vout. These two inherent weaknesses make this snubber circuit solution less attractive since the switching devices must be able to withstand much larger voltage stresses than desired. As discussed earlier, a higher voltage rated device also has a larger forward conduction voltage drop than a lower voltage rated device thereby contributing to higher losses.

For a better understanding of the aforementioned snubber circuit see M. Domb, et. al, "Nondissipative Turn-off Snubber in a Forward Converter: Analysis, Design Procedure and Experimental Verification", 1985 PCI Proceeding, pp. 54–68, and Pinto, et. al, "A New Boost Converter Using a Nondissipative Snubber", 1996 IEEE PESC Proceedings, pp. 397–401, which are incorporated herein by reference. The aforementioned circuits are just a few examples of snubber circuits and are submitted only to provide the reader a sample of the references presently available.

Figure 3:
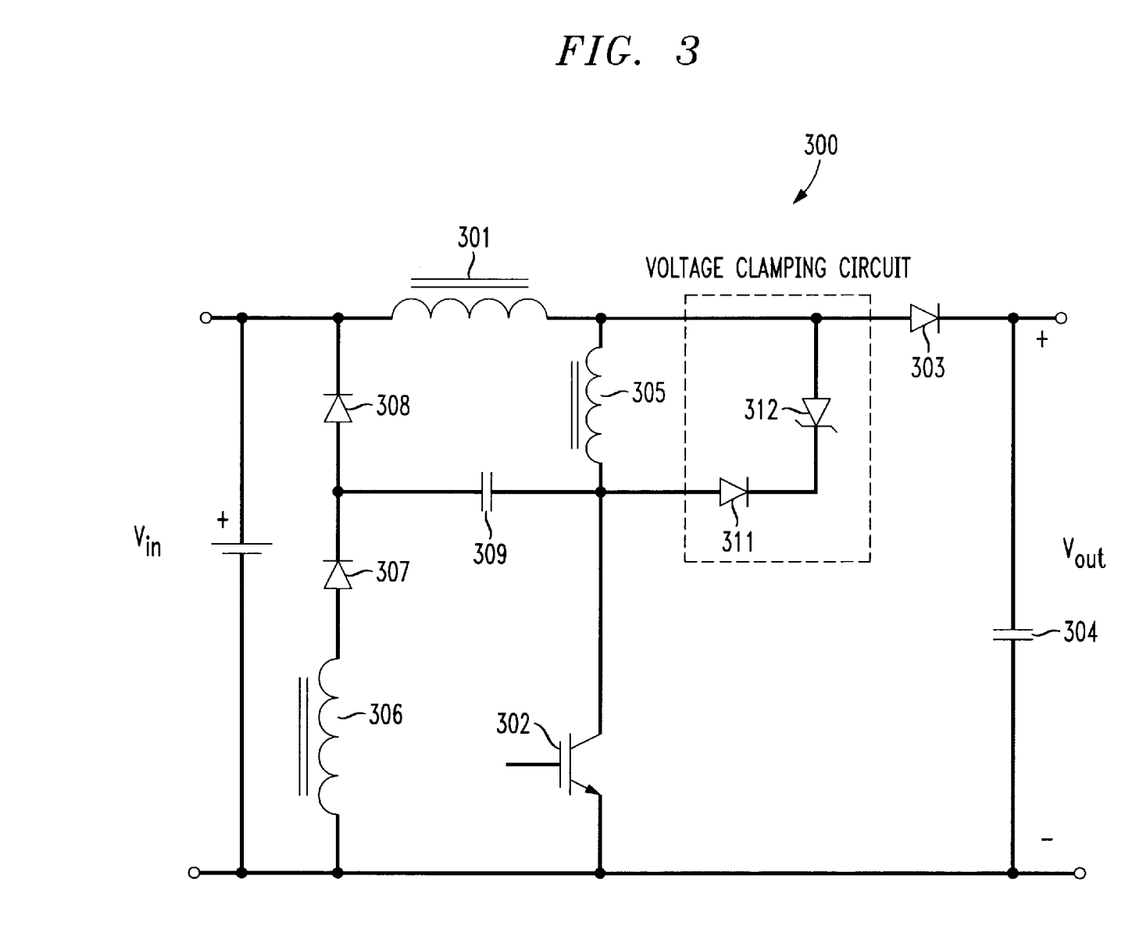
FIG. 3 illustrates a schematic diagram of an embodiment of a boost converter employing an embodiment of a peak voltage clamping circuit constructed according to the principles of the present invention.

Turning now to FIG. 3, illustrated is a schematic diagram of an embodiment of a boost converter 300 employing an embodiment of a peak voltage clamping circuit constructed according to the principles of the present invention. The boost converter 300 includes a boost inductor 301, a boost main boost switch 302, a boost diode 303 coupled to the boost inductor 301, and an output capacitor 304 coupled to the boost diode 303. The boost converter 300 also includes a resonant, passive snubber circuit having first and second snubber inductors 305, 306, first and second snubber diodes 307, 308, and a snubber capacitor 309. The boost converter 300 still further includes a voltage clamping circuit having a blocking switch (e.g., a blocking diode) 311 and a zener diode 312.

The resonant, passive snubber circuit coupled to the boost inductor 301 and the main boost switch 302 not only limits reverse recovery currents in the boost inductor 301 during turn-on of the main boost switch 302 but also reduces the collector-to-emitter voltage rise rate of the main boost switch 302 during its turn-off transition thereby reducing its turn-off loss. The blocking diode 311 and the zener diode 312 between the main boost switch 302 and the boost diode 303 cooperate to provide a conductive path from the main boost switch 302 to an output of the boost converter 300 and a freewheeling path for the first snubber inductor 305. This conductive (or freewheeling) path eliminates the over-voltage transient or "spike" that occurs in the converter configuration discussed with respect to FIG. 2 and provides a peak voltage clamping action at a predetermined voltage level equal to the output voltage Vout of the boost converter 300 plus the zener voltage Vdz across the zener diode 312 to reduce the voltage stresses on the main boost switch 302 and the boost diode 303. Otherwise, the snubber capacitor 309 will be overcharged causing a voltage across the main boost switch 302 to exceed the predetermined voltage level. The output capacitor 304 smooths the output voltage Vout and provides an adequate "sink" to absorb the switching transient energy. The main boost switch 302 may be selected from semiconductor devices such as an insulated gate bipolar transistor (IGBT), a metal oxide semiconductor (MOS)-controlled thyristor (MCT), or a MOS field effect transistor (MOSFET). Of course, other devices are well within the broad scope of the present invention.

Figure 4A:
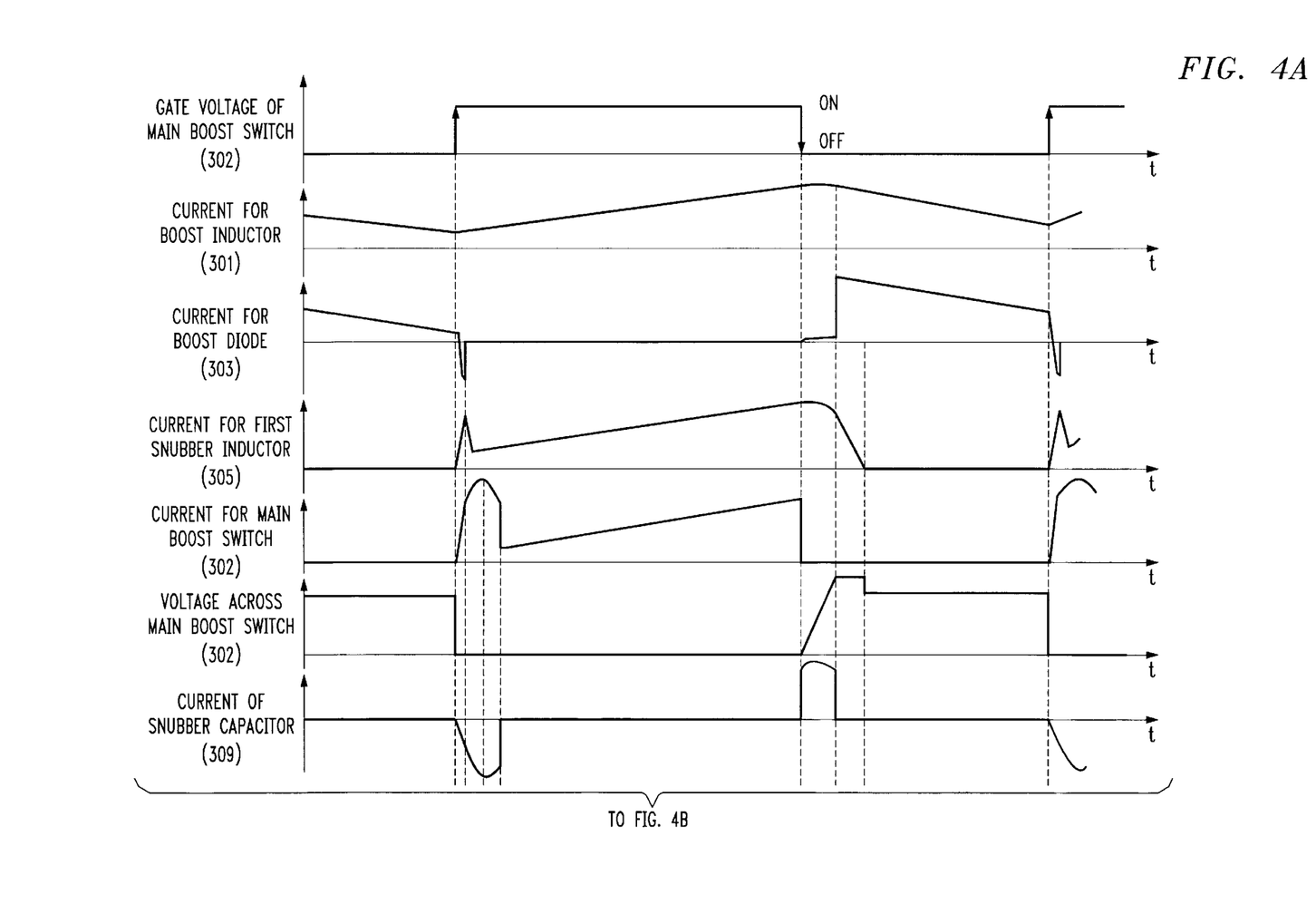
FIG. 4 illustrates various waveforms for components of the boost converter of FIG. 3.
Figure 4B:
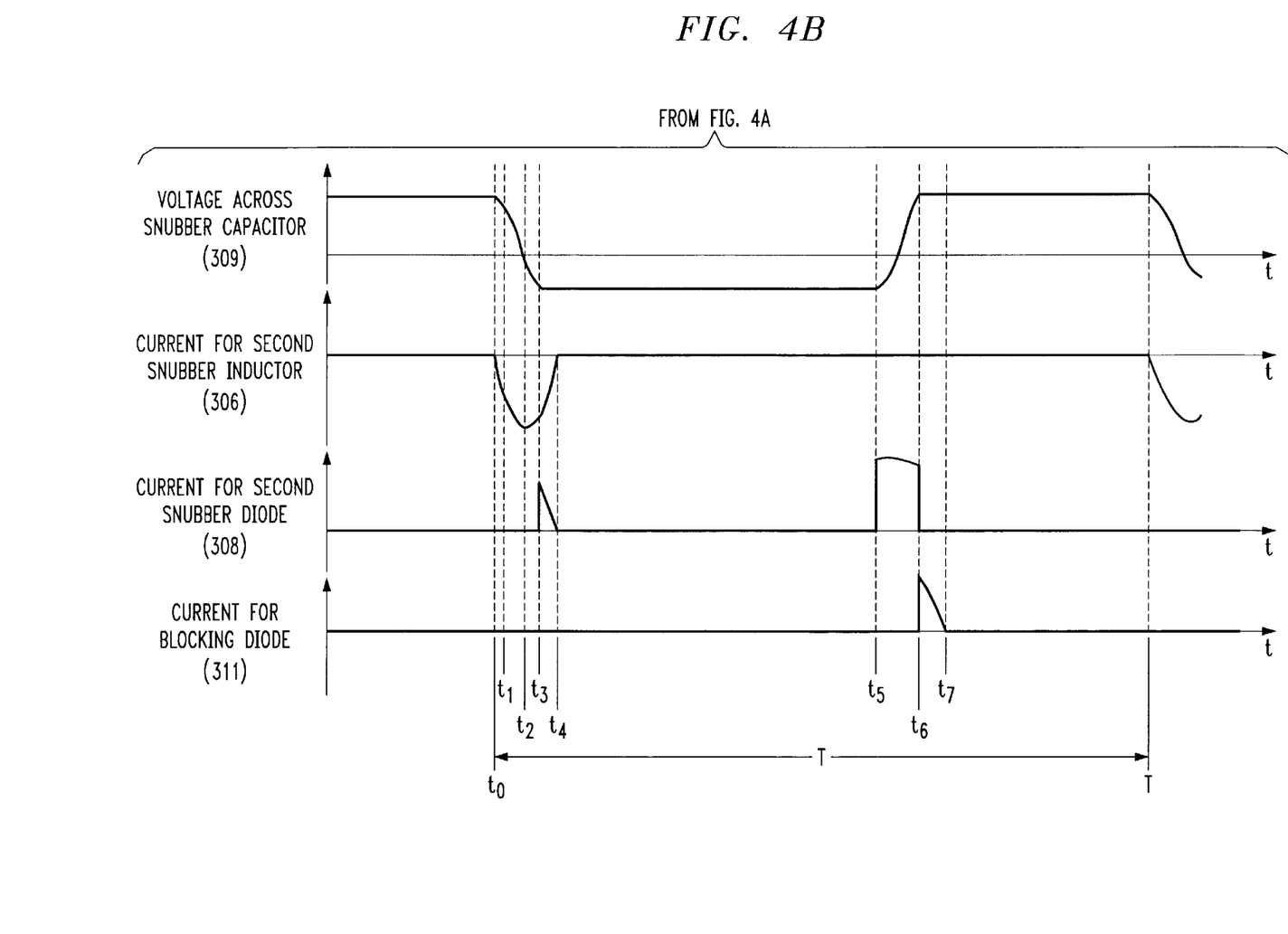

Now, with continuing reference to FIG. 3 and the waveforms of various components of the boost converter 300 in FIG. 4, an operation of the boost converter will hereinafter be described. Initially, the main boost switch 302 is considered to be OFF (non-conducting state) and the boost inductor 301 current flows to the output through the boost diode 303. The second snubber diode 308 is OFF and the voltage across the snubber capacitor 309 is less than the output voltage Vout. Thus, no current is flowing through the first snubber inductor 305. Now, the main boost switch 302 is turned ON in a zero-current turn-on manner due to the snubber inductors 305, 306. The snubber capacitor 309 starts to discharge through the main boost switch 302, the second snubber inductor 306 and the first snubber diode 307. The peak value of the discharge current is limited by the second snubber inductor 306. The resonant transition time is determined by the values of the second snubber inductor 306 and snubber capacitor 309 which also determines the minimum operating duty cycle. Meanwhile, the reverse recovery current of the boost diode 303 also starts to flow from the output capacitor 304 through the first snubber inductor 305 and the main boost switch 302. The first snubber inductor 305 limits the peak value of the reverse recovery current. Thus, the main boost switch 302 turn-on peak current is limited by the snubber inductors 305, 306.

When the boost diode 303 reverse recovery process ends, the current through the first snubber inductor 305 starts to freewheel through the main boost switch 302, the boost inductor 301 and the input source (applying an input voltage Vin). Since the boost inductor 301 is generally much larger in value than the first snubber inductor 305, the current through the boost inductor 301 does not change immediately and a voltage spike develops across the first snubber inductor 305. The voltage clamping circuit consisting of the blocking diode 311 and the zener diode 312 limit the voltage spike to slightly greater than the zener voltage Vdz. Therefore, the peak voltage stress across the boost diode 303 is limited to the output voltage Vout plus the zener voltage Vdz. During this time, the current through the boost inductor 301 continues to increase at the rate of the input voltage Vin divided by the sum of the boost inductance 301 and the first snubber inductance 305.

The current in second snubber inductor 306 reaches its peak when the voltage across snubber capacitor 309 goes to zero. The resonant current in second snubber inductor 306 will then continue to charge the snubber capacitor 309 in the reverse direction until it reaches the input voltage Vin. At this point, should the current in the second snubber inductor 306 be greater than zero, it will it will turn-on the second snubber diode 308 and continue to flow through the snubber diodes 307, 308 returning energy to the input source. If the current in the second snubber inductor 306 reaches zero before the voltage across the snubber capacitor 309 reaches the input voltage Vin, a zero voltage turn-off will not occur at the next turn-on time of the main boost switch 302. This will cause a small voltage jump across the main boost switch 302. This small voltage jump, however, is significantly smaller than the traditional hard switching turn-off voltage jump equal to the output voltage Vout. With careful parameter selection of the snubber capacitor 309 and the snubber inductors 305, 306, the zero voltage turn-off can be achieved for a wide range of input and output conditions.

As the second snubber diode 308 starts to conduct, the voltage across snubber capacitor 309 is maintained at the input voltage Vin level since it does not have a discharge path. Meanwhile, current through the boost inductor 301 continues to increase until the main boost switch 302 is turned OFF based on the output voltage Vout regulation requirement. At the turn-off of the main boost switch 302, the current stored in the boost inductor 301 and the first snubber inductor 305 starts to discharge the snubber capacitor 309 through the second snubber diode 308, and the turn-off energy is recovered to the input source. By properly sizing the snubber capacitor 309, the voltage rise rate across the main boost switch 302 and therefore the main boost switch 302 turn-off loss can be controlled. After the voltage across snubber capacitor 309 discharges to zero, the current through the boost inductor 301 will charge the snubber capacitor 309 in the positive direction. As the voltage across the snubber capacitor 309 increases, the charge current flowing through the first snubber inductor 305 decreases. The current through the boost inductor 301 does not change appreciably since the boost inductor 301 is generally much larger than the first snubber inductor 305. Therefore, the boost diode 303 begins to conduct current.

The current through the first snubber inductor 305 may not be zero and it will continue to charge the snubber capacitor 309. When the voltage across first snubber inductor 305 is slightly larger than the zener voltage Vdz, the blocking diode 311 and the zener diode 312 conduct and the main boost switch 302 peak voltage is clamped at a value equal to the output voltage Vout plus the zener voltage Vdz. The voltage across snubber capacitor 309 would then be equal to the output voltage Vout plus the zener voltage Vdz minus the input voltage Vin. The conduction period of the zener diode 312 is determined by the values of the first snubber inductor 305, the snubber capacitor 309, the input voltage Vin and the output power.

As the current through the first snubber inductor 305 and the zener diode 312 reaches zero and for the condition that the voltage across snubber capacitor 309 is less than the output voltage Vout, no current will flow through the first snubber inductor 305. Thus, the main boost switch 302 voltage equals the output voltage Vout since the boost diode 303 is conducting. Otherwise, the snubber capacitor 309 will discharge through the loop formed by the second snubber inductor 306, the first snubber diode 307, the first snubber inductor 305, the boost diode 303, and the output load. Eventually, the first snubber diode 307 stops conducting and the current in snubber inductors 305, 306 reaches zero. At that time, the voltage across snubber capacitor 309 drops below the output voltage Vout until a new cycle begins.

In summary, advantages of the voltage clamping circuit include, among other things, the use of simple, passive circuit components without the need for a control requirement, and the selection of typically low power-rated components to provide the clamping voltage for the main boost switch and the boost diode to the output voltage plus the zener voltage. This allows selection of lower voltage-rated intrinsic boost converter switching devices (e.g., semiconductor devices) which generally cost less and provide greater overall efficiencies. The clamping circuit allows a simple, resonant, lossless passive snubber to be used, and provides a conductive path for the extra current to flow. Therefore, the voltage clamping circuit together with the nondissipative snubber allows basically zero current turn-on and zero voltage turn-off to take place for the main boost switch without significantly increasing its voltage stresses.

Exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa.

For a better understanding of power electronics, power converter topologies, such as boost power converters, and snubber circuits, see N. Mohan, et al., "Power Electronics: Converters, Applications, and Design", Second Edition, John Wiley & Sons, Inc. (1995), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use in a boost converter having a main boost switch, a boost inductor, a boost diode coupled to said boost inductor and said main boost switch and a resonant, passive snubber coupled to said boost inductor and said main boost switch that limits reverse recovery currents in said boost diode during a turn-on of said main boost switch, a peak voltage clamping circuit for reducing voltage stress on said main boost switch caused by operation of said snubber, comprising:

a blocking switch and a zener diode, coupled in series between said main boost switch and said boost diode, that cooperate to provide a conductive path from said main boost switch to an output of said boost converter for electrical currents that exceed a predetermined peak voltage value thereby to reduce said voltage stress on said main boost switch.

2. The circuit as recited in claim 1 wherein said blocking switch and said zener diode further cooperate to limit voltage stress on said boost diode.

3. The circuit as recited in claim 1 wherein said predetermined peak voltage substantially equals an output voltage of said boost converter plus a reverse bias voltage of said zener diode.

4. The circuit as recited in claim 1 further comprising a snubber inductor, coupled in parallel with said series-coupled blocking and zener diodes, that limits a reverse recovery current through said boost diode.

5. The circuit as recited in claim 1 wherein said boost converter further comprises an output capacitor, coupled to said boost diode, that smooths an output voltage of said boost converter.

6. The circuit as recited in claim 1 wherein said blocking switch is a diode biased to conduct said electrical currents from said main boost switch to said boost diode.

7. The circuit as recited in claim 1 wherein said main boost switch is selected from the group consisting of:

an insulated gate bipolar transistor (IGBT), a metal oxide semiconductor (MOS)-controlled thyristor (MCT), and a MOS field effect transistor (MOSFET).

8. For use in a boost converter having a main boost switch, a boost inductor, a boost diode coupled to said boost inductor and said main boost switch and a resonant, passive snubber coupled to said boost inductor and said main boost switch that limits reverse recovery currents in said boost diode during a turn-on of said main boost switch, a method of reducing voltage stress on said main boost switch caused by operation of said snubber, comprising the steps of:

coupling a blocking switch and a zener diode in series between said main boost switch and said boost diode; and causing said blocking switch and said zener diode to cooperate to provide a conductive path from said main boost switch to an output of said boost converter for electrical currents that exceed a predetermined peak voltage value thereby to reduce said voltage stress on said main boost switch.

9. The method as recited in claim 8 further comprising the step of causing said blocking switch and said zener diode further to cooperate to limit voltage stress on said boost diode.

10. The method as recited in claim 8 wherein said predetermined peak voltage substantially equals an output voltage of said boost converter plus a reverse bias voltage of said zener diode.

11. The method as recited in claim 8 further comprising the step of limits a reverse recovery current through said boost diode with a snubber inductor coupled in parallel with said series-coupled blocking and zener diodes.

12. The method as recited in claim 8 further comprising the step of smoothing an output voltage of said boost converter with an output capacitor coupled to said boost diode.

13. The method as recited in claim 8 wherein said blocking switch is a diode biased to conduct said electrical currents from said main boost switch to said boost diode.

14. The method as recited in claim 8 wherein said main boost switch is selected from the group consisting of:

an insulated gate bipolar transistor (IGBT), a metal oxide semiconductor (MOS)-controlled thyristor (MCT), and a MOS field effect transistor (MOSFET).

15. A boost converter, comprising:

a boost inductor that receives electrical currents provided to an input of said boost converter;

a main boost switch, coupled to said boost inductor and said input, that switches to conduct said electrical currents through said boot inductor;

a boost diode, coupled to said boost inductor and said main boost switch, that transmits a portion of said electrical currents to an output of said boost converter;

a resonant, passive snubber, coupled to said boost inductor and said main boost switch, that limits reverse recovery currents in said boost diode during a turn-on of said main boost switch; and a peak voltage clamping circuit for reducing voltage stress on said main boost switch caused by operation of said snubber, said circuit including a blocking diode and a zener diode, coupled in series between said main boost switch and said boost diode, that cooperate to provide a conductive path from said main boost switch to an output of said boost converter for electrical currents that exceed a predetermined peak voltage value thereby to reduce said voltage stress on said main boost switch.

16. The boost converter as recited in claim 15 wherein said blocking diode and said zener diode further cooperate to limit voltage stress on said boost diode.

17. The boost converter as recited in claim 15 wherein said predetermined peak voltage substantially equals an output voltage of said boost converter plus a reverse bias voltage of said zener diode.

18. The boost converter as recited in claim 15 further comprising a snubber inductor, coupled in parallel with said series-coupled blocking and zener diodes, that limits a reverse recovery current through said boost diode.

19. The boost converter as recited in claim 15 further comprising an output capacitor, coupled to said boost diode, that smooths an output voltage of said boost converter.

20. The boost converter as recited in claim 15 wherein said main boost switch is selected from the group consisting of:

an insulated gate bipolar transistor (IGBT), a metal oxide semiconductor (MOS)-controlled thyristor (MCT), and a MOS field effect transistor (MOSFET).

\* \* \* \* \*